May 7, 1935.  F. T. KREIN  2,000,339
PROCESS FOR MAKING CONFECTION PACKAGES
Filed Dec. 30, 1932  2 Sheets-Sheet 1
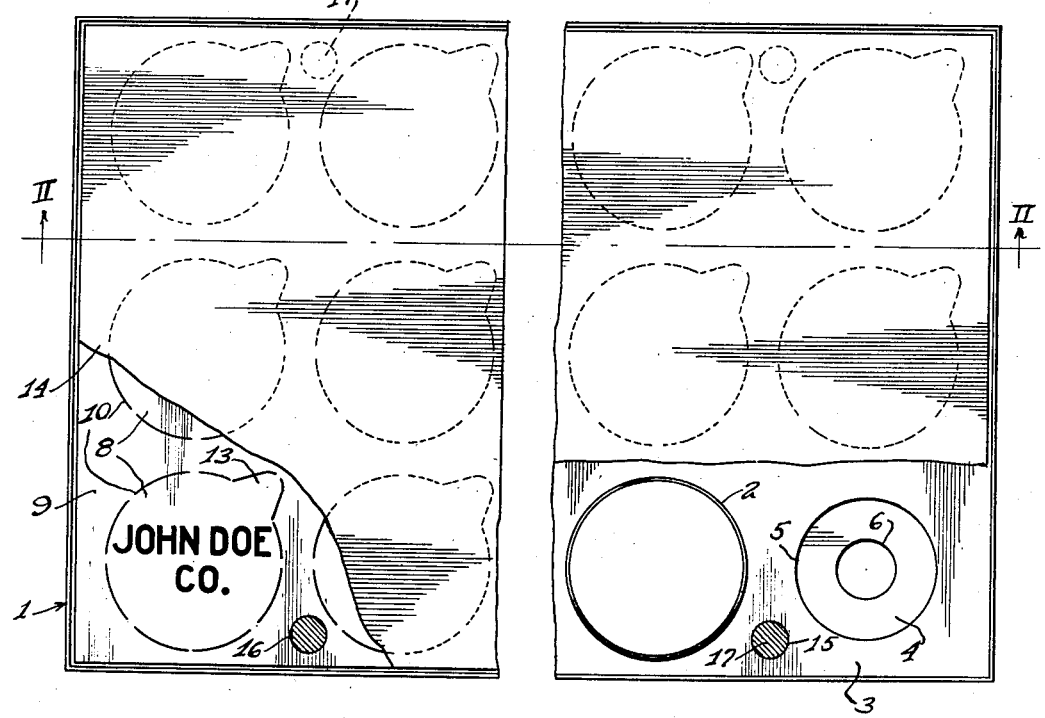
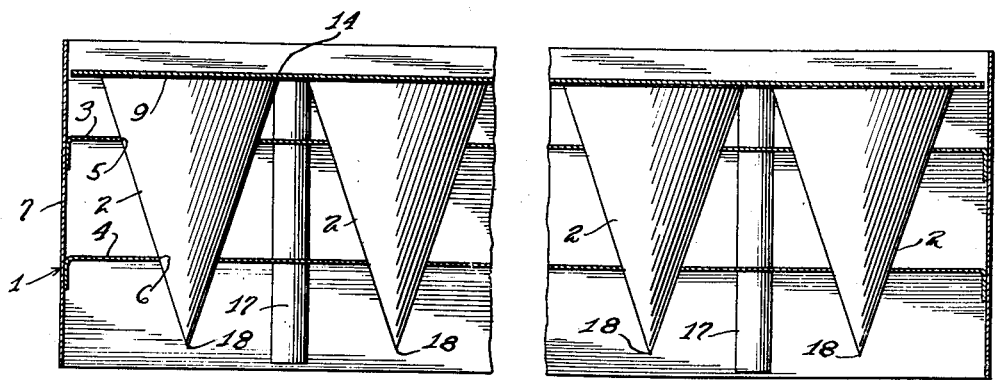
Inventor
Frederick Thomas Krein.
by
Charles Hill
Attys.

May 7, 1935. F. T. KREIN 2,000,339
PROCESS FOR MAKING CONFECTION PACKAGES
Filed Dec. 30, 1932 2 Sheets-Sheet 2
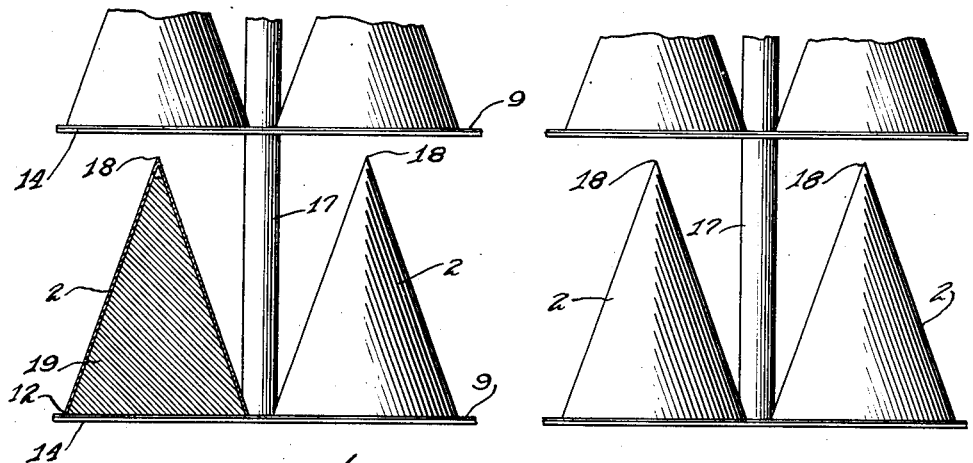
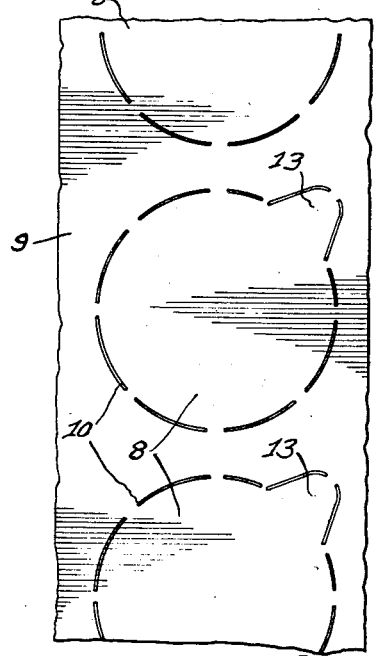
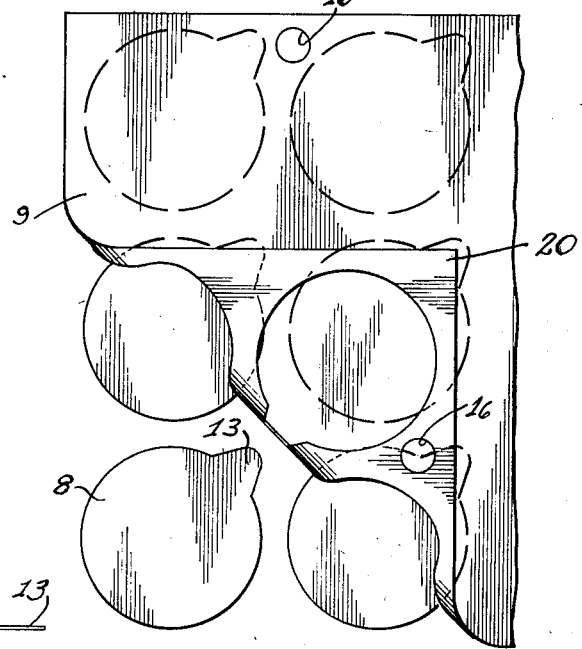
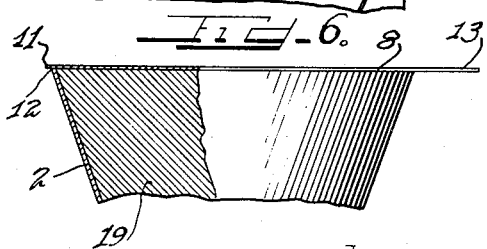
Frederick Thomas Krein.

Patented May 7, 1935

2,000,339

UNITED STATES PATENT OFFICE 2,000,339

PROCESS FOR MAKING CONFECTION PACKAGES

Frederick Thomas Krein, Park Ridge, Ill., assignor to Vortex Cup Company, Chicago, Ill., a corporation of Delaware Application December 30, 1932, Serial No. 649,576

6 Claims. (Cl. 62—173)

This invention has to do with frozen confection such as frozen sherbet or ice cream and is concerned more particularly with the art of individual packages therefor and a process of and apparatus for making the same.

An aim of this invention is to provide an article of manufacture in the form of a properly identified packaged frozen confection, as well as a novel method for making the same.

It is also an object of the invention to provide an ice cream package which is substantially sealed when it reaches the ultimate consumer.

It is a further object of the invention to provide in a package of this character a cap which is disposed entirely outside of the cup containing the confection.

It is a further object of the invention to provide, in a package of ice cream or the like, a cap which serves normally as a seal for the container and which may be stripped from the container by substantially a single movement of the cap.

It is another object of the invention to provide a sheet of flexible material in which an ice cream package cap is formed and from which the cap is readily detachable.

It is an object of the invention to provide a novel process by which a package of ice cream or the like may be sealed during the hardening or freezing of the confection.

It is a further object of the invention to provide a novel process by which a package of frozen confection may be provided with a cap or cover during the hardening or freezing of the confection in the package.

It is another object of the invention to provide a process for capping a plurality of cups of frozen confection at substantially the same time.

In carrying the invention into practice, a plurality of cups containing each a charge of substantially semi-liquid ice cream or the like are supported in a predetermined arrangement, and a sheet of paper or other suitable flexible material has formed therein as by perforations a like number of areas in the same arrangement, each of a size sufficient to substantially completely cover a cup. The sheet is placed over the cups so that a cup area is positioned over each cup, and the parts are inverted so that the sheet supports the cups with the ice cream in contact with the cap portions. Thus arranged, the unit is subjected to a freezing process until the ice cream is in a non-fluid condition, and adheres to the cap areas so tenaciously that when an attempt is made to strip the sheet of the containers, the perforated portions are torn away and only the cap areas remain.

Other objects and advantages of the invention will appear as the description proceeds.

This invention (in a preferred form) is illustrated in the drawings and hereinafter more fully described.

Figure 1 is a fragmentary plan view of the apparatus forming the subject matter of the present invention.

Figure 2 is a sectional view taken approximately in the plane designated by the line II—II in Figure 1.

Figure 3 is a fragmentary view, partly in section and partly in elevation, showing the arrangement of parts of the apparatus during the hardening or freezing process.

Figure 4 is a fragmentary view of a portion of a sheet from which the package caps are formed.

Figure 5 is a fragmentary plan view illustrating how the caps are separated from the sheet in which they are formed.

Figure 6 is a fragmentary view, partly in section and partly in elevation, showing a container of frozen confection to which a cap embodying the principles of the invention is applied.

Referring now more particularly to the drawings, the invention contemplates the provision of a suitable support such as the tray 1 having a plurality of sockets in a predetermined arrangement for receiving a plurality of cups 2 in which the confection is to be contained. One suitable tray construction involves the provision of horizontally spaced shelves 3 and 4 having holes 5 and 6, respectively, arranged to engage spaced portions of the cups 2 to prevent the same from wobbling. The holes 5 and 6 may of course be formed in accordance with the shape of the cups, which in turn may be varied as desired. For illustrative purposes only, therefore, the cups 2 are shown as having a conical shape, and of course the openings 5 and 6 are correspondingly dimensioned. While the material of which the cups 2 are made may be metallic or non-metallic, and may be stiff or flexible, and may be porous or non-porous, it is preferably made of such material as parchment or thin bond paper which is flexible and yet which is sufficiently stiff to retain its shape, and whose confection contacting surface is waxed or sufficiently moistureproof to discourage excessive absorption of the confection.

The shelves 3 and 4 are held in spaced relationship by any suitable means such as the wall 7, to which the shelves may be secured by any suitable means as by soldering, brazing, spot welding, rivets or the like.

The caps to be applied to the cups 2 may be of any suitable material such as the material of which the cups 2 are made. The caps may be provided and separately applied in covering relation to the several containers or cups 2, but are preferably formed as individual areas 8 in a sheet 9, said areas being defined by perforated lines 10. The cap areas 8 are such that each may be so arranged over a cup 2 as to preferably overhang the same as shown at 11 in Figure 6, or at least so as to engage the entire rim 12 of a cup 2. Each cap area 8 is preferably moreover formed with a finger 13 by which the cap 6 may be grasped to facilitate removal thereof from its cup 2, as will be more fully pointed out as the description proceeds. The cap areas 8 are formed in the sheet 9 in the same arrangement as the sockets in the tray 1, so that the sheet 9 may be placed over the cups 2 in such a manner as to insure a cap area being located in proper covering relation to each cup 2.

As has been stated, it is preferred that the sheet 9 be of flexible sheet material, and thin bond or parchment paper is suitable for the purpose. In the carrying out of the process by which the caps are to be applied to the ice cream containing cups 2, it is desirable that the cups with the confection or ice cream contained therein be inverted so that they rest on the sheet 9 with the ice cream engaging the cap areas 8, and so that during the process of inverting, there will be substantially no leakage of the confection between the cups 2 and the sheet 9. To this end, a flat, stiff backing plate 14 for use in conjunction with the sheet 9 is provided. The plate 14 is preferably sufficiently heavy to hold the sheet 9 in engagement with all of the rims of the cups 2 when the plate overlies the sheet as shown in Figures 1 and 2, and any suitable material such as metal may therefore be used for this purpose.

Any suitable instrumentalities may be made use of in positioning the sheet 9 so that the cap areas 8 thereof will be located over corresponding cups as soon as the sheet 9 is placed over the cups, without necessitating adjustment of the sheet. Such instrumentalities may take any suitable form, one illustrative example thereof being included herein. To this end, the tray 1 is provided with a plurality of openings 15 and the sheet 9 and plate 14 are provided with registering holes and pins 16 and 17, respectively, arranged to be aligned with the respective holes 15 in the tray 1 when the parts are arranged in operative relationship as shown in Figures 1 and 2. The pins 17 may be solid or tubular, as desired, and may be riveted, soldered, brazed, welded or otherwise secured to the plate 14. Moreover, while the pins 17 and openings 15 and 16 are shown to be round, it will be understood that the shape may be varied as desired.

It will be observed that the pins 17 are of such length that they project from the plate 14 a distance in excess of the height of the cups 2 and thickness of the sheet 9, so that when the parts are in the relationship shown in Figure 2, the pins project below the apices 18 of the cups 2. Obviously, when the plate 14, sheet 9 and cups 2 are inverted to the position shown in Figure 3, the pins 17 project above the apices 18 of the cups 2. The pins 17 are thus effective to support an identical assembly of a plate, sheet and superimposed cups 2, and it is thus apparent that with this construction any desired number of plates and associated sheets and cups of frozen confection may be stacked in superimposed relation to take up a minimum amount of space.

In inverting the plate 14 from the position shown in Figure 2 to the position shown in Figure 3, it is necessary merely to hold the hand against the plate 14 and grasp the tray 1 so that the same is urged toward the plate 14, and invert the entire unit, thereafter raising the tray 1 to withdraw the same from the cups 2 and plate 14 and sheet 9. It is thus apparent that, by reason of the engagement of the pins 17 and sheet 9 and tray 1, displacement of the cups relative to the cap areas 8 cannot occur.

When the plate and associated members are arranged as shown in Figure 3, preferably with a plurality of plates and associated parts arranged in superimposed or stacked relation as shown in Figure 3, the same are placed in a hardening or refrigerating compartment in which carbon dioxide or dry ice or any other suitable refrigerant is employed to change the substantially semi-liquid confection or ice cream 19 to a solid at preferably sub-freezing temperature. When the desired amount of hardening of the confection 19 is obtained, the confection in each cup is frozen to the cap 8 and is therefore effectively sealed by the cap. The adhesion between the confection 19 and the cap 8 moreover is such as to effectively oppose accidental removal of the cap.

When the cups 2 and associated instrumentalities are removed from the hardening or refrigerating compartment, the sheet 9 is accordingly secured to each cup by a cap portion 8. The peforations 10 defining the individual caps 8 are, as pointed out above, preferably such as to form a relatively weak connection between said cap portions and the remainder of the sheet 9. Accordingly, by placing the cups 2 containing the solidified confection 19 in a position such as that shown in Figure 2, and removing the plate 14 to afford access to the sheet 9, a projecting corner 20 or other free portion of the sheet 9 may be grasped, (Figure 5) turned away from the cups 2, and ripped off in the manner clearly shown in Figure 5. The adhesion between the confection 19 and the caps being greater than the resistance afforded by the perforated portions 10 to separation of the caps 8 from the remainder of the sheet 9, said remainder of the sheet, in the act of removal of the latter, becomes completely divorced from the caps 8 as shown in Figure 5, leaving an individual cap for each cup secured thereto as shown in Figure 6.

The cap portions 8 may be blank or, if desired, they may bear printed matter or any suitable design or ornamentation as indicated by the lettering "John Doe Co." in Figure 1.

It is thus apparent that the invention affords an extremely simple apparatus and an extremely simple process by which cups or other containers of frozen confection may be provided with individual cups which are effective as seals for the cups or containers. In the practice of the invention, moreover, little expense is involved. It will moreover be noted that the invention affords a new article of manufacture wherein a body or quantity of ice cream or the like in a solid condition may be dispensed to the ultimate consumer with the confection entirely sealed, and wherein means is afforded as by the tab or finger 13 for enabling the consumer to quickly and without undue effort strip a cap 8 off a cup in order that access may be obtained to the confection itself.

The food material charged into the cups being of a substantially plastic consistency, it will be substantially precluded from leaking between the caps and the cups when the same are inverted. Moreover, when the cups of confection are inverted over the caps, prior to the freezing or hardening process, there exists a condition similar to that obtaining when a glass of water is inverted over a sheet of paper engaging the rim of the glass. That is, just as the vacuum inside of the glass and the pressure of the atmosphere on the free surface of the paper enable the paper to support the water, so does the vacuum produced in the cup when the same and its contents are inverted and the atmosphere pressure on the free surface of the inverted cap engaging the rim of the cup, cooperate with the cap to provide a substantially leak-proof seal between the cap and the cup.

I am aware that many changes may be made and numerous details of construction may be varied through a wide range without departing from the principles of this invention, and I, therefore do not purpose limiting the patent granted hereon otherwise than necessitated by the prior art.

I claim as my invention:

1. The process of making a package of confection, comprising the steps of placing a quantity of semi-liquid confection in a container, placing a cap over the mouth of the container, inverting the container, confection and cap while the cap closes the mouth of the container so that the container and confection are supported by the cap and the confection intimately contacts the cap, and subjecting the container, cap and confection to a sub-freezing temperature for the confection until the latter is solid and firmly adheres to the container and cap.

2. The process of making a plurality of packages of confection by employing containers each including a cup and a cap therefor, comprising the steps of loading a plurality of cups with semi-liquid confection, placing a sheet formed with readily separable areas so that the areas close the mouths of the cups, inverting the cups, confection and sheet so that the cups and confection are supported by the sheet, subjecting the sheet, container and confection to a sub-freezing temperature for the confection until the latter is solid and firmly adheres to the container and cap and grasping a marginal portion of the sheet and pulling it away from the confection with a force which separates the caps from the remainder of the sheet, leaving a plurality of individual complete packages.

3. The process of capping a plurality of cups of confection, comprising the steps of covering a plurality of cups loaded with semi-liquid confection with a plurality of separably connected caps, inverting the cups and caps so that the cups and confection rest directly on the caps, hardening the confection to such an extent that it firmly adheres to the cups and caps, and disconnecting the caps from one another to afford an individual cap for each cup.

4. The method of applying identification print to the exposed surface of a confection in a container, which comprises applying a cap bearing identifying print to said surface and thereafter freezing the confection so that the container, confection and cap constitute a single frozen unit with the confection functioning as an adhesive.

5. The process of packaging a confection, consisting of filling a container brimful of confectionery mass, placing a cap over said container in contact with said confectionery mass and overlying the upper rim of the container, and utilizing said confectionery mass as an adhesive to bind the cap to the container and to the confectionery mass by chilling said mass until it hardens sufficiently to adhere to the cap and container.

6. The process of capping a plurality of containers of confection, consisting of covering a plurality of containers, each filled with a confectionery mass, with a plurality of separably connected caps, with each cap in contact with the confection in the corresponding container, chilling the confection until it firmly adheres to the containers and caps, and disconnecting the caps from one another to afford an individual cap for each container.

FREDERICK THOMAS KREIN.